United States Patent
Zagorski et al.

(10) Patent No.: US 9,573,515 B2
(45) Date of Patent: Feb. 21, 2017

(54) AUTOMATIC TURN SIGNAL ACTIVATION DURING A LANE CHANGE MANEUVER

(71) Applicant: GM Global Technology Operations LLC, Detroit, MI (US)

(72) Inventors: Chad T. Zagorski, Clarkston, MI (US); Nikolai K. Moshchuk, Grosse Pointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 34 days.

(21) Appl. No.: 14/583,240

(22) Filed: Dec. 26, 2014

(65) Prior Publication Data
US 2016/0185279 A1 Jun. 30, 2016

(51) Int. Cl.
*B60Q 1/34* (2006.01)
*B60Q 1/40* (2006.01)
*B60Q 1/26* (2006.01)

(52) U.S. Cl.
CPC .............. *B60Q 1/346* (2013.01); *B60Q 1/34* (2013.01); *B60Q 1/40* (2013.01); *B60Q 1/26* (2013.01)

(58) Field of Classification Search
CPC ............ B60Q 1/26; B60Q 1/34; B60Q 1/346; B60Q 1/40
See application file for complete search history.

(56) References Cited

U.S. PATENT DOCUMENTS

| | | | | |
|---|---|---|---|---|
| 5,877,681 A * | 3/1999 | Williams | ................ | B60Q 1/26 340/478 |
| 7,986,223 B2 * | 7/2011 | Au | ......................... | B60Q 1/346 340/477 |
| 8,498,778 B2 * | 7/2013 | Seymour | ............... | B60Q 1/346 701/36 |
| 8,577,554 B2 * | 11/2013 | Wolterman | ............ | B60Q 1/346 701/36 |

* cited by examiner

*Primary Examiner* — Dale W Hilgendorf
(74) *Attorney, Agent, or Firm* — BrooksGroup

(57) ABSTRACT

A method for automatic activation of a vehicle turn indicator is disclosed. The method may include determining whether a lane change maneuver is impending in a specified direction. The method may also include determining whether the vehicle turn indicator has been activated through a driver interface. The vehicle turn indicator may be engaged when not activated through the driver interface.

4 Claims, 3 Drawing Sheets

AUTOMATIC TURN SIGNAL ACTIVATION DURING A LANE CHANGE MANEUVER

TECHNICAL FIELD

The field to which the disclosure generally relates includes autonomous vehicle systems and more particularly to the automatic control of vehicle turn indicators.

BACKGROUND

In conventional vehicle turn signal control a manual lever is generally provided through which the human driver indicates an impending turn. The lever may be translated about a pivot in a direction consistent with the planned turn to initiate signal activation. As the vehicle's steering wheel is turned in the intended direction the signal remains on, and following the turn as the steering wheel is returned to steer the vehicle in straight line a mechanical device generally deactivates the signal.

Vehicles with autonomous functions may use computer controllers to assist the human driver in operating various systems. Autonomous functions may operate with human initiation or control. Other systems may engage automatically, and intervene in preprogrammed situations based on sensed conditions and selected parameters. The ability to provide autonomous systems creates a need to reconsider the remaining conventional vehicle operations.

SUMMARY OF ILLUSTRATIVE VARIATIONS

According to a number of variations a method may be provided for automatic activation of a vehicle turn indicator. The method may include determining whether a turning maneuver is impending in a specified direction. The method may also include determining whether the vehicle turn indicator has been activated through a driver interface. The vehicle turn indicator may be engaged when not activated through the driver interface.

A number of other variations may include a method for automatic activation and deactivation of a vehicle turn indicator. The method may include determining whether a turning maneuver is impending in a specified direction. The method may also include determining whether the vehicle turn indicator has been activated in the specified direction through a driver interface. The vehicle turn indicator may not be engaged if the vehicle turn indicator has been activated through the driver interface. The vehicle turn indicator may be engaged if the vehicle turn indicator has not been activated through the driver interface.

Still other variations may include a method for automatic vehicle turn signal activation. The method may include determining whether a turning maneuver is impending in a specified direction. The method may also include determining whether an automatic turn signal activation is enabled and whether an automatic turn signal escalation is enabled. The vehicle turn signal may be engaged in a first level when the automatic turn signal activation is enabled and the automatic turn signal escalation is not enabled. The vehicle turn signal may be engaged in a second level when the automatic turn signal activation is enabled and the automatic turn signal escalation is enabled.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
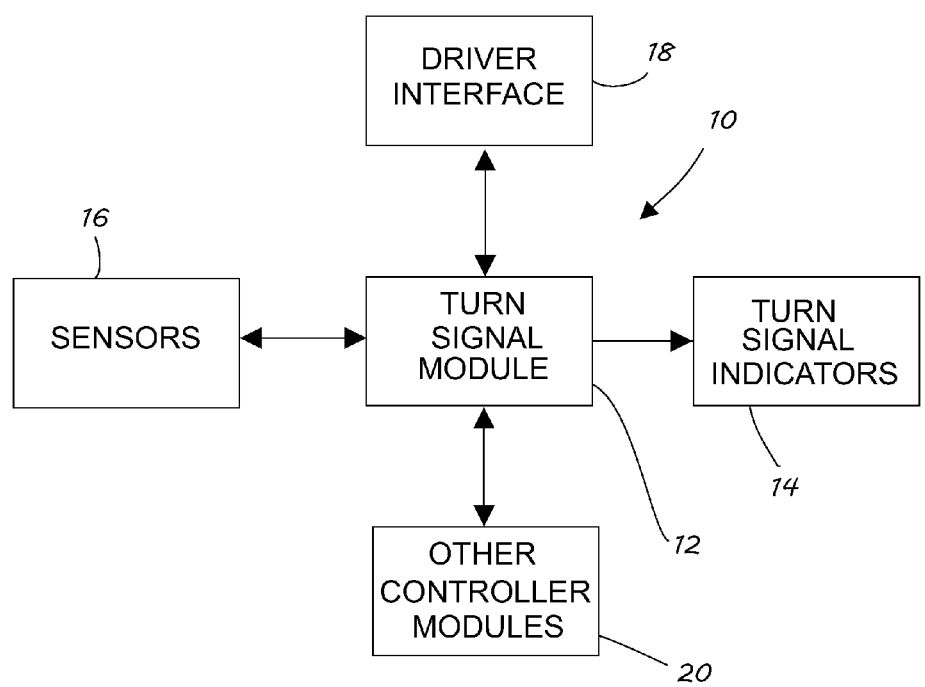
FIG. 1 is a simplified block diagram according to a number of variations.

Referring to FIG. 1, illustrated is a block diagram for an automatic turn signal system 10 according to a number of variations. Automatic turn signal system 10 may include a turn signal module 12, which may electronically control the activation and deactivation of turn signal indicators 14. The turn signal indicators 14 may include a number of selectively illuminating devices that may indicate an impending or ongoing turn, and may include a number of variations in the mode of indication based on various inputs. For example the turn signal module 12 may initiate activation of additional or different lights or cycle illumination at various intensities or rates to convey the nature of the situation. Input to the turn signal module 12 may come from various sensors 16. These may include steering wheel angle, lane markings detection, speed, obstacle detection and other sensors which may communicate directly with the turn signal module 12 or with other controller modules 20, with which the turn signal module communicates. For example, a module for autonomous driving may provide a signal indicative of an impending turning maneuver such as a lane change. In addition, a driver interface 18 may provide driver inputs to the turn signal module 12 and may provide feedback to the driver on the state of turn signal indication.

Figure 2:
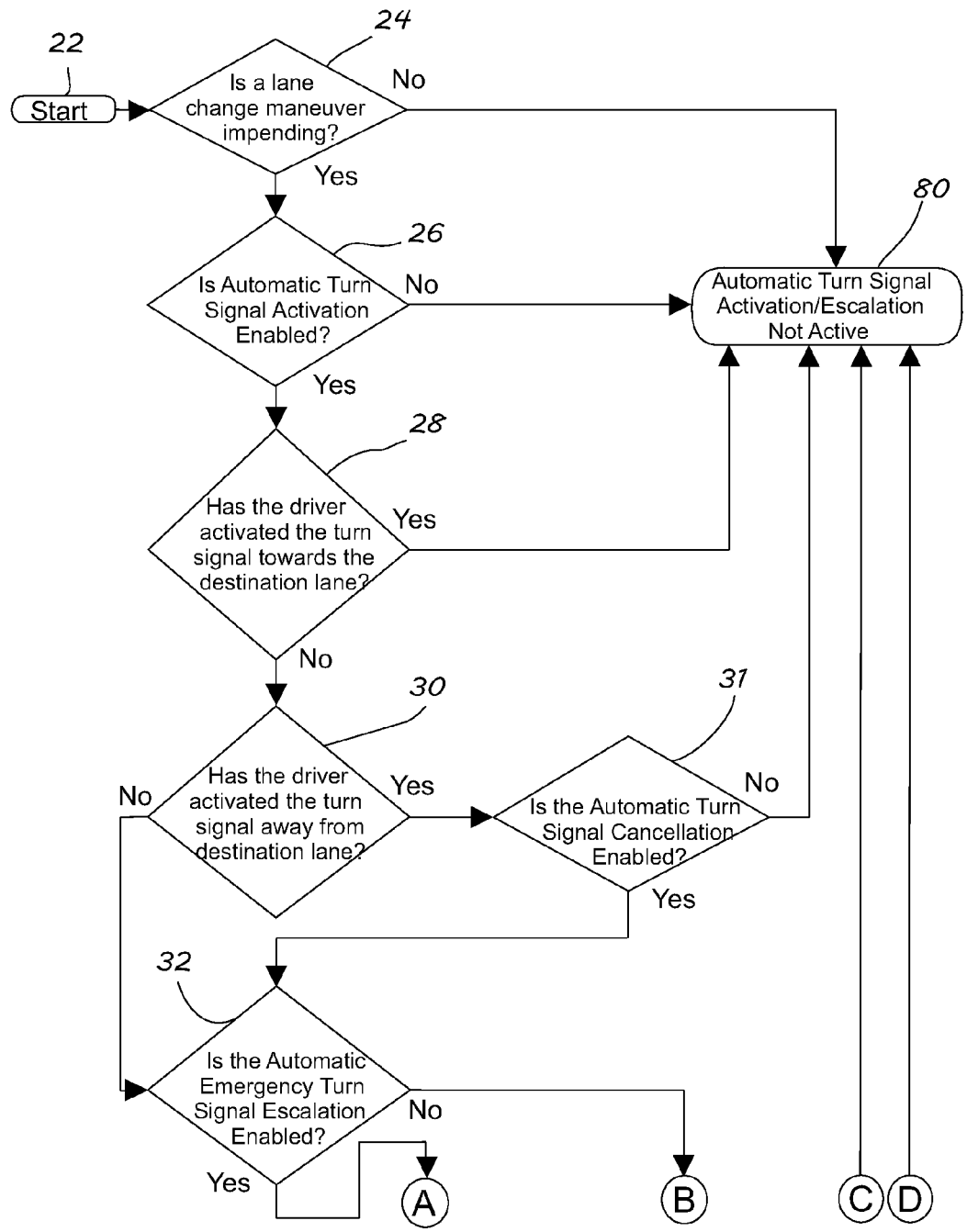
FIG. 2A is a functional diagram according to a number of variations.
FIG. 2B is a continuation of the functional diagram of FIG. 2A according to a number of variations.
Figure 2:
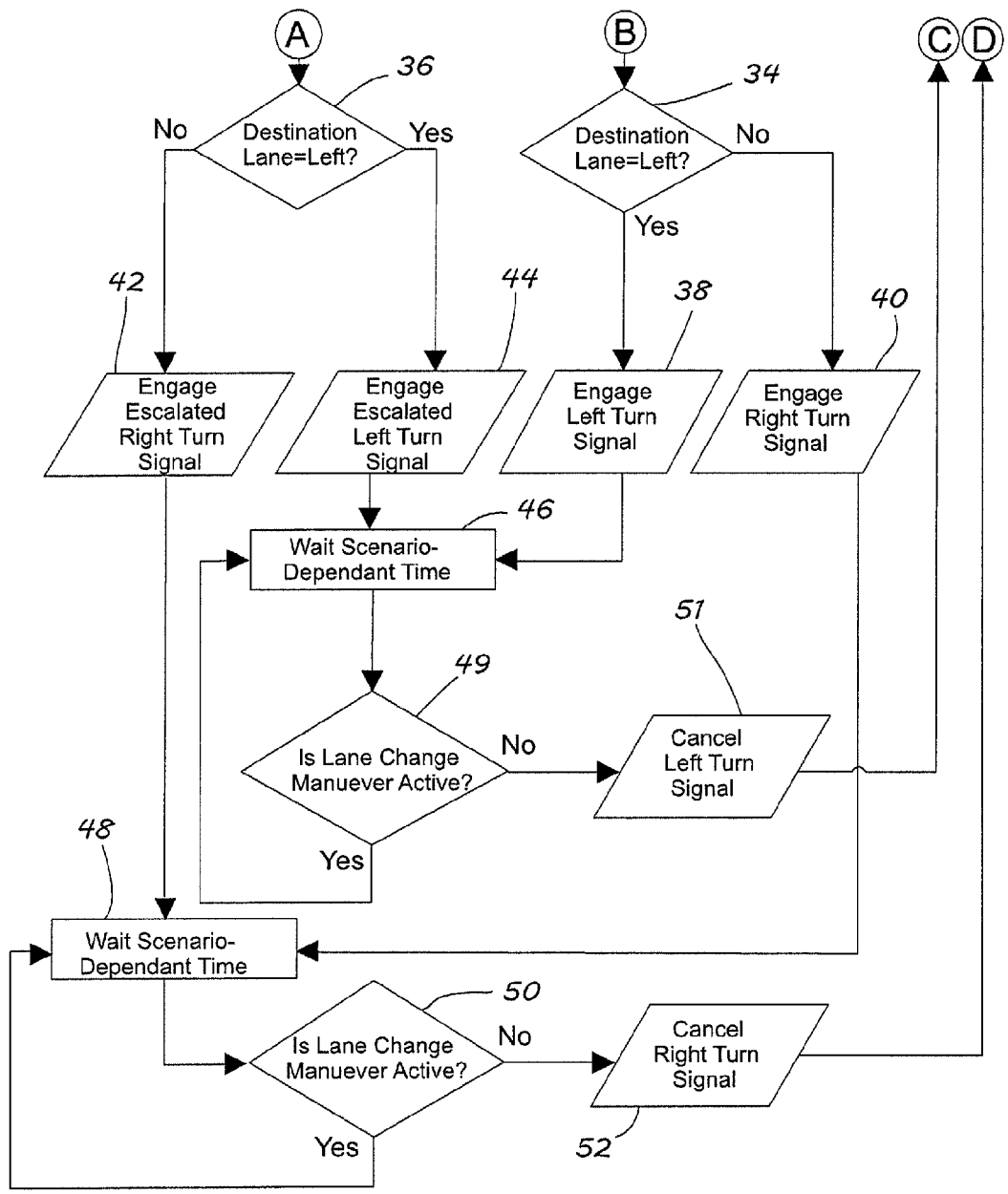

Referring additionally to FIGS. 2A and 2B, a method is illustrated for turn signal activation and deactivation in a vehicle according to a number of variations. The method continues between FIG. 2A and FIG. 2B at points A, B, C and D. In step 22, the turn signal routine is started. In step 24, a determination may be made as to whether a lane change maneuver is impending. The lane change maneuver may be indicated by the vehicle's driver through the driver interface 18 or by an autonomous system through its controller module 20. If, at step 24 it is determined that a lane change maneuver is not impending, then the routine proceeds to step 80 where the routine is exited and automatic turn signal activation is not active. If a determination is made that a lane change maneuver is impending, then in step 26, the system determines whether automatic turn signal activation is enabled. In the case of a negative determination regarding automatic turn system activation at step 26, the routine proceeds to step 80 where the routine is exited and automatic turn signal activation is not active. This may be the case if the driver has elected to disable the automatic turn signal system, or the controller has disabled the automatic turn signal system in according to preprogrammed criteria. In the case of a positive determination regarding automatic turn system activation at step 26, the routine proceeds to step 28.

In step 28, a determination may be made as to whether the driver has activated the turn signal in the direction of the destination lane. If a positive determination is made that the turn signal has already been activated by the driver in the direction of the destination lane then the routine proceeds to step 80 where the routine is exited and automatic turn signal activation is not active. If a determination is made that the turn signal has not been activated by the driver in the direction of the destination lane then the routine continues to step 30 to determine whether the driver has activated the turn signal in a direction away from the destination lane. If it is determined that the driver has not activated the turn signal in a direction away from the destination lane, then the routine proceeds to step 32. If it is determined that the driver has activated the turn signal in a direction away from the destination lane, then the routine proceeds to step 31 for a determination of whether automatic turn signal cancellation is enabled. Cancellation may not be enabled if the driver's input has priority based on the selected criteria. If it is determined that automatic turn signal cancellation is not enabled then the routine proceeds to step 80 where the routine is exited and automatic turn signal activation is not active. If it is determined that automatic turn signal cancellation is enabled, then the routine proceeds to step 32.

In step 32, a determination may be made on whether automatic emergency turn signal escalation is enabled. Escalation may be enabled when selected criteria such as an approaching collision is indicated to provide a second level signal. Escalation may initiate activation of additional or different lights or cycle illumination at various intensities, patterns, or rates to convey the nature of the situation. If a determination is made that escalation is not enabled, the routine proceeds to step 34 (shown in FIG. 2B). If a determination is made that escalation is enabled, the routine proceeds to step 36 (shown in FIG. 2B). At each of steps 34 and 36 a determination is made as to whether the destination lane is to the left. If the routine is at step 34 and the determination is made that the destination lane is to the left, then the routine proceeds to step 38 and a control action is performed to engage the vehicle's left turn signal. If the routine is at step 34 and the determination is made that the destination lane is not to the left (i.e. to the right), then the routine proceeds to step 40 and a control action is performed to engage the vehicle's right turn signal. If the routine is at step 36 and the determination is made that the destination lane is to the left, then the routine proceeds to step 44 and a control action is performed to engage the vehicle's left turn signal in escalated mode. If the routine is at step 36 and the determination is made that the destination lane is not to the left, then the routine proceeds to step 42 and a control action is performed to engage the vehicle's right turn signal in escalated mode. If a turn signal may have been engaged through the driver interface in a direction away from the destination lane, it is disengaged when the intended turn signal is engaged if automatic turn signal cancellation is enabled.

If the vehicle's left turn signal is activated at step 38 or 44, the routine proceeds to step 46 where a timer is provided that has been set to an interval calibrated to the scenario. When the interval has elapsed, the routine proceeds from step 46 to step 49 where a determination may be made as to whether the lane change maneuver is active. If the lane change is active, the routine returns to step 46 and the loop is repeated until the lane change or maneuver is complete. When, at step 49 a determination is made that the lane change maneuver is no longer active then the routine proceeds to step 51 where a control action is performed to cancel the left turn signal or the escalated left turn signal. After canceling the turn signal, the routine proceeds from step 51 to step 80 (shown in FIG. 2A), where the routine is exited and automatic turn signal activation is not active.

If the vehicle's right turn signal is activated at step 40 or 42, the routine proceeds to step 48 where a timer that has been set to an interval calibrated to the scenario. When the interval has elapsed, the routine proceeds from step 48 to step 50 where a determination may be made as to whether the lane change maneuver is active. If the lane change is active, the routine returns to step 48 and the loop is repeated until the lane change is complete. When, at step 50 a determination is made that the lane change maneuver is no longer active then the routine proceeds to step 52 where a control action is performed to cancel the right turn signal or the escalated right turn signal. After canceling the turn signal, the routine proceeds from step 52 to step 80 (shown in FIG. 2A), where the routine is exited and automatic turn signal activation is not active. When at step 80 the routine is complete and may be reinitiated at step 22.

The following description of variants is only illustrative of components, elements, acts, products and methods considered to be within the scope of the invention and is not in any way intended to limit such scope by what is specifically disclosed or not expressly set forth. Components, elements, acts, products and methods may be combined and rearranged other than as expressly described herein and still are considered to be within the scope of the invention.

Variation 1 may include a method for automatic activation of a vehicle turn indicator is disclosed. The method may include determining whether a turning maneuver is impending in a specified direction. The method may also include determining whether the vehicle turn indicator has been activated through a driver interface. The vehicle turn indicator may be engaged when not activated through the driver interface.

Variation 2 may include a method as set forth in variation 1 and may include the steps of waiting a selected time interval and then determining whether the turning maneuver is active.

Variation 3 may include a method as set forth in variation 2 and may include the step of repeating the step of waiting a selected time interval when the turning maneuver is active.

Variation 4 may include a method as set forth in any of variations 1 through 3 and may include the step of determining whether the turn signal has been activated through the driver interface in a direction away from the specified direction.

Variation 5 may include a method as set forth in variation 4 and may include the step of determining whether a second level turn signal activation is enabled.

Variation 6 may include a method for automatic activation and deactivation of a vehicle turn indicator. The method may include determining whether a turning maneuver is impending in a specified direction. The method may also include determining whether the vehicle turn indicator has been activated in the specified direction through a driver interface. The vehicle turn indicator may not be engaged if the vehicle turn indicator has been activated through the driver interface. The vehicle turn indicator may be engaged if the vehicle turn indicator has not been activated through the driver interface.

Variation 7 may include a method as set forth in variation 6 and may include the step of determining whether an automatic turn signal escalation is enabled.

Variation 8 may include a method as set forth in variation 7 and may include the steps of engaging the turn signal in a first level when the automatic turn signal escalation is not enabled, and engaging the turn signal in a second level when the automatic turn signal escalation is enabled.

Variation 9 may include a method as set forth in any of variations 6 through 8 and may include the steps of waiting for an interval of time to elapse after the vehicle turn indicator is engaged, and determining whether the turning maneuver is active after the interval of time has elapsed.

Variation 10 may include a method as set forth in variation 9 and may include including the step of repeating the step of waiting for an interval of time to elapse when it is determined that the turning maneuver is active.

Variation 11 may include a method as set forth in variation 9 and may include including the step of deactivating the vehicle turn indicator when it is determined that the turning maneuver is not active.

Variation 12 may include a method as set forth in any of variations 6 through 11 and may include the step of determining whether the vehicle turn indicator has been activated in a direction away from the specified direction through the driver interface.

Variation 13 may include a method as set forth in variation 12 and may include the step of determining whether an automatic turn signal escalation is enabled when it is determined that the vehicle turn indicator has been activated in a direction away from the specified direction through the driver interface.

Variation 14 may include a method for automatic vehicle turn signal activation. The method may include determining whether a turning maneuver is impending in a specified direction. The method may also include determining whether an automatic turn signal activation is enabled and whether an automatic turn signal escalation is enabled. The vehicle turn signal may be engaged in a first level when the automatic turn signal activation is enabled and the automatic turn signal escalation is not enabled. The vehicle turn signal may be engaged in a second level when the automatic turn signal activation is enabled and the automatic turn signal escalation is enabled.

Variation 15 may include a method as set forth in variation 14 and may include the steps of waiting a time interval after the vehicle turn signal is engaged, and determining whether the turning maneuver is active after the time interval has elapsed.

Variation 16 may include a method as set forth in variation 14 or 15 and may include including the step of not engaging the vehicle turn signal when it is determined that the automatic turn signal activation is not enabled.

Variation 17 may include a method as set forth in any of variations 14 through 16 and may include including the step of determining whether the vehicle turn signal has been activated through a driver interface, and not engaging the vehicle turn signal when it is determined that the vehicle turn signal has been activated through a driver interface.

Variation 18 may include a method as set forth in any of variations 14 through 17 and may include the step of determining whether the vehicle turn signal has been activated through a driver interface in a direction away from the specified direction, and determining whether an automatic turn signal cancellation is enabled.

Variation 19 may include a method as set forth in variation 18 and may include the step of not engaging the vehicle turn signal when it is determined that the automatic turn signal cancellation is not enabled.

Variation 20 may include a method as set forth in any of variations 14 through 19 and may include the steps of determining whether the turning maneuver is active, and disengaging the vehicle turn signal when the turning maneuver is not active.

The above description of select variations within the scope of the invention is merely illustrative in nature and, thus, variations or variants thereof are not to be regarded as a departure from the spirit and scope of the invention.

What is claimed is:

1. A method for automatic activation of a vehicle turn indicator comprising the steps of: identifying a destination lane separate from a current lane of travel; determining whether a turning maneuver to change lanes from the current lane of travel to the destination lane is impending in a specified direction; determining whether the vehicle turn indicator has been engaged through a driver interface, in the direction of the destination lane; engaging the vehicle turn indicator if the vehicle turn indication has not activated through the driver interface and determining whether a second level turn signal activation is enabled; and activating the vehicle turn indicator in the direction of the destination lane at an intensified level relative to a first level turn signal activation used when the second level turn signal activation is not enabled.

2. A method for automatic activation and deactivation of a vehicle turn indicator comprising the steps of: determining a destination lane; determining whether a turning maneuver is impending in a specified direction, where the specified direction is toward the destination lane; determining whether the vehicle turn indicator has been activated in the specified direction through a driver interface; evaluating whether the destination lane is in one direction, where the one direction is one of always to the left or always to the right; not engaging the vehicle turn indicator if the vehicle turn indicator has been activated through the driver interface; engaging the vehicle turn indicator in a second direction that is not the one direction when it is determined that the destination lane is not in the one direction, and if the vehicle turn indicator has not been activated through the driver interface, and engaging the vehicle turn indicator in the one direction when it is determined that the destination lane is in the one direction, and if the vehicle turn indicator has not been activated through the driver interface, and identifying a destination lane separate from a current lane of travel; determining whether an automatic turn signal escalation is enabled; and activating the vehicle turn indicator in the direction of the destination lane at an intensified level relative to a first level turn signal activation used when a second level turn signal activation is not enabled.

3. A method for automatic activation and deactivation of a vehicle turn indicator comprising the steps of: determining a destination lane; determining whether a turning maneuver is impending in a specified direction, where the specified direction is toward the destination lane; determining whether the vehicle turn indicator has been activated in the specified direction through a driver interface; evaluating whether the destination lane is in one direction, where the one direction is one of always to the left or always to the right; not engaging the vehicle turn indicator if the vehicle turn indicator has been activated through the driver interface; engaging the vehicle turn indicator in a second direction that is not the one direction when it is determined that the destination lane is not in the one direction, and if the vehicle turn indicator has not been activated through the driver interface, and engaging the vehicle turn indicator in the one direction when it is determined that the destination lane is in the one direction, and if the vehicle turn indicator has not been activated through the driver interface, and engaging the turn signal in a first level when the automatic turn signal escalation is not enabled; and engaging the vehicle turn indicator in a second level when the automatic turn signal escalation is enabled, wherein the first level activates the turn signal in one direction at a first intensity and the second level activates the turn signal in one direction at a second intensity level that is greater than the first intensity level.

4. A method for automatic vehicle turn signal activation comprising the steps of: determining whether a turning maneuver is impending in a specified direction; determining whether an automatic turn signal activation is enabled; determining whether an automatic turn signal escalation is enabled; engaging the vehicle turn signal in a first level when the automatic turn signal activation is enabled and the automatic turn signal escalation is not enabled, indicating the turning maneuver in one direction; engaging the vehicle turn signal in a second level when the automatic turn signal activation is enabled and the automatic turn signal escalation is enabled, indicating the turning maneuver in one direction, and determining a destination lane where the turning maneuver is a lane change from a current lane of travel to the destination lane; determining whether automatic turn signal activation is enabled; exiting without automatic turn signal activation when it is determined that automatic turn signal activation is not enabled; determining whether an automatic turn signal escalation is enabled; activating the vehicle turn indicator in the direction of the destination lane at an intensified level relative to a first level turn signal activation used when a second level turn signal activation is not enabled; determining whether the turning maneuver is active; and disengaging the vehicle turn signal when the turning maneuver is not active.

* * * * *